United States Patent Office 3,714,976
Patented Feb. 6, 1973

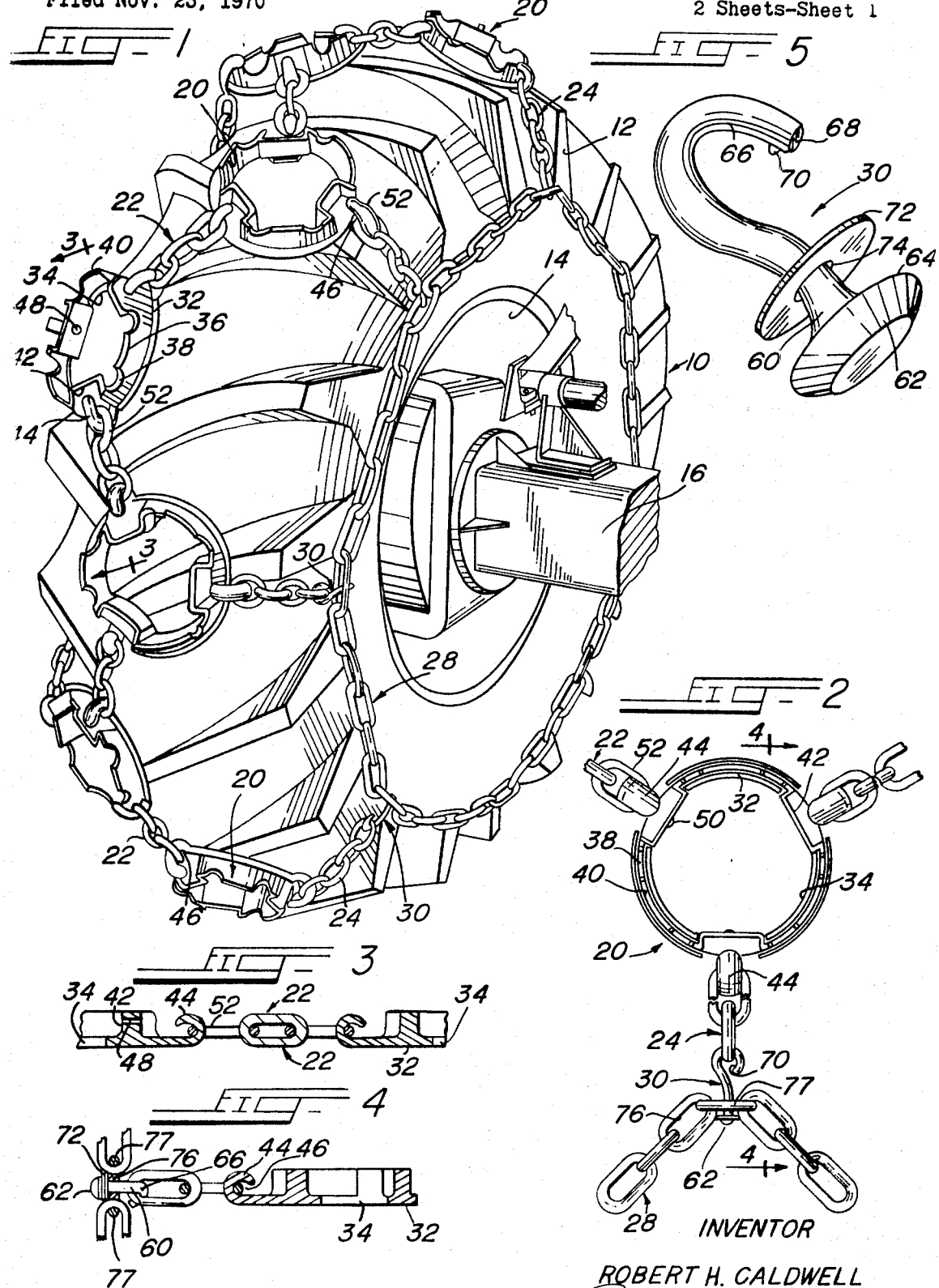

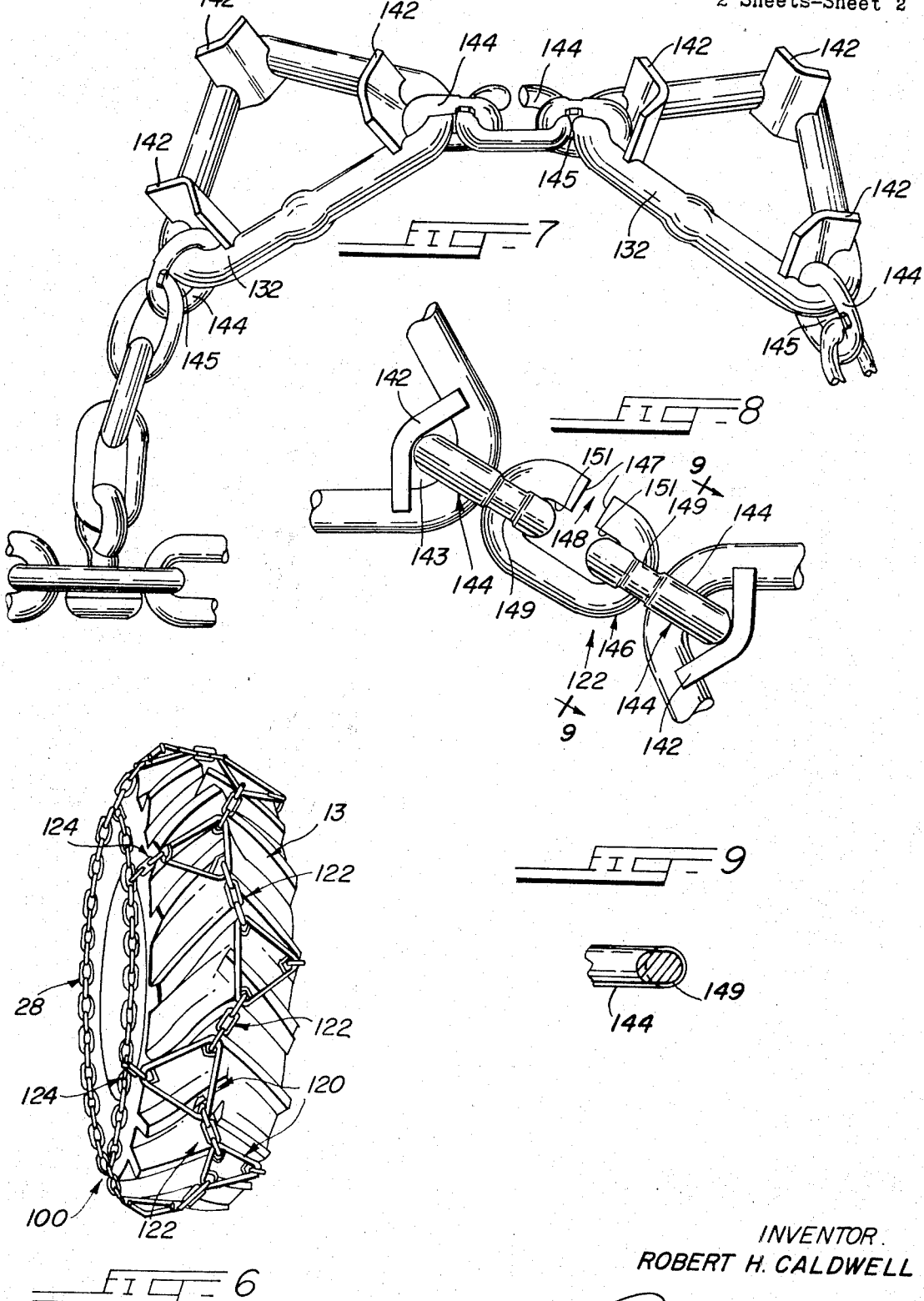

3,714,976
TIRE CHAIN AND CONNECTOR
Robert H. Caldwell, 1042 W. State St.,
Jacksonville, Ill. 62650
Continuation-in-part of abandoned application Ser. No. 815,816, Apr. 14, 1969. This application Nov. 23, 1970, Ser. No. 91,797
Int. Cl. B60c 27/20
U.S. Cl. 152—228                                           17 Claims

ABSTRACT OF THE DISCLOSURE

A tire chain having circumferentially spaced cleat members incorporated in a heavy duty linked chain device each spaced from each other on the tire tread, offset one from the other, and connected together by short links of chain. The alternate ones of the cleat members are connected in staggered relationship to side chains. The advantages of the assembly are increased traction for off-the-road equipment, ease of assembly and disassembly, adjustability, self-cleaning action, and prevention of chain wind-up and twisted or broken links.

BACKGROUND OF THE INVENTION

This application is a continuation in part of U.S. Patent application Ser. No. 815,816 filed Apr. 14, 1969, now abandoned.

Heavy duty tire chains generally comprise a pair of side or rim chains carrying generally transversely extending spaced cross chains or traction members therebetween with shackles at the ends of the rim chains to affix the chain around a tire. The ends of the rim chains are joined by hooks or shackles in a known manner. Such chains are fabricated as a single unit and weigh about 150 pounds each, even for a tire size 16.9/14-30. In order to install such a chain, it is necessary to manually lift the greater part of the chain to properly place it up on a tire, since the heavy rubber cleats and treads of the tire interfere with using a sliding or dragging motion of the chain upon the tire during assembly. In addition, because the prior art chains are tied together as a unit, any adjustment of the lay of the chain on the tire requires lifting a large share of the chain. If a chain is to be repaired, it is necessary to dismount the entire chain to properly handle the part involved. The extreme difficulty in mounting such assembled chains is a matter of common knowledge.

SUMMARY OF THE INVENTION

By the present invention it is proposed to provide a heavy duty tire chain constructed and arranged in a manner such that the difficulties encountered heretofore are eliminated.

This is accomplished generally by a heavy duty chain comprising a plurality of traction cleat members which are angularly spaced about the tread of the tire and detachably connected to each other and to side chains disposed along the opposite side of the tire.

The detachable connection between the individual traction cleat members and the side chains makes it possible to assemble the chain on the tire rather than having to lift the major portion of the weight of a preassembled chain as was done heretofore. The traction cleat members may be of lesser width than the tire tread and arranged in staggered relationship so that any two adjacent ones of the cleat members span the width of the tread.

In one form of the invention the cleat members may have a circular base from which a plurality of angularly spaced teeth project, and be cast from a mold.

In another embodiment the cleat members may be formed from a rod shaped into a triangle. Plate means are fixed to the rod to provide projecting teeth.

In both forms of cleat members, the means connecting the traction cleat members to each other and to the side or rim chains are in the form of short chain link lengths which are connected to the cleat members at points angularly spaced about 120°. The traction cleat members may be of lesser width than the tire tread and disposed thereon in offset or staggered relation so that any two adjacent cleats span the width of the tread.

DESCRIPTION OF THE DRAWINGS

An embodiment of this invention is shown in the drawings, wherein:

FIG. 1 is a perspective view of a tractor tire to which is installed the anti-skid and ground gripper device of this invention;

FIG. 2 is a fragmentary plan view of a cleat member and its associated link chains;

FIG. 3 is a fragmentary cross-sectional view taken along the line 3—3 of FIG. 1;

FIG. 4 is a fragmentary cross-sectional view taken along the line 4—4 of FIG. 2;

FIG. 5 is a perspective view of a hook member which is preferably used with this invention;

FIG. 6 is a perspective view of a tractor tire showing another embodiment of an anti-skid ground gripper chain incorporating the principles of the invention mounted thereon;

FIG. 7 is a fragmentary perspective view of FIG. 6 showing a pair of traction cleat members and the associated linking chain arrangement;

FIG. 8 is a fragmentary plan view of a pair of adjacent cleat members and showing in particular the center connecting linkages; and FIG. 9 is a cross-sectional view taken generally along the lines 9—9 of FIG. 8.

THE PREFERRED EMBODIMENT

Referring to FIGS. 1–5 of the drawings, one embodiment of this invention is illustrated.

In FIG. 1, the tire 10 is shown to be the off-the-road type with heavy cleats 12 on the surface of the tire tread 13. The tire 10 is mounted on a drive wheel 14 carried by an axle 16 of a tractor or other heavy duty prime mover not shown.

The traction cleat members 20 are mounted around the tire by means of the connecting center or traction member chain linkages 22 and the side or shoulder linkages 24 which are connected around the tire in alternate and staggered spaced intervals on each side to the side or rim chain 28, only one of which is shown, by means of the plural connectors 30.

As also shown in FIGS. 2–4, each traction cleat member 20 has a ring-shaped base 32 which is open in the center as at 34. A circumferential wall 36 extends from the base 32 and has serrations 38 forming upstanding teeth 40 projecting from the base. The wall 36 has three offsets or hook shields 42 and opposite or within each offset 42 is a hook 44 having an opening 46 which extends or faces toward the offsets. The offsets and hooks are angularly spaced about 120° from each other and are an integral part of the base. In the wall of the offsets 42, a bore 48 is provided to receive a bolt 50 to lock and close the opening between the hooks 44 and the offset 42 over or about an end link 52 of the side linkage 24 and the center linkages 22. As shown, this end link 52 is preferably pear shaped. The cleats 20 can be used with or without the lock bolts 50.

The details of the construction of the connector 30 are shown in FIG. 5, wherein the shank 60 is shown to have the integral round base 62 with a generally flattened inner surface 64 and a hook member 66, the end 68 of which bears the detents or protuberance 70 on the inside surface. The shank has the washer 72 thereon and the aperture 74 of the washer is spaced from the shank. The aperture 74 is large enough to allow the washer 72 to rest against the flat surface 64 of the base 62 and form a bearing surface between the base and any member engaged by the shank 60. The curve of the hook 66 can be any desired shape or radius and may be such that the washer 72 is retained on the shank. In any event, the detent 70 can be of such size as to prevent the washer 72 from passing off the end of the hook and also to detain a link within the hook itself. The hook and shank are essentially the same diameter so as to pass through the aperture 76 of an intermediate chain link 77 as shown in FIG. 4.

The side or rim chains 28 are preferably constructed of heat treated and hardened straight links. A side chain shackle (not shown) is used to tie each side chain 28 around the tire 10 end to end. The side linkages 24 have pear shaped links 52 at each end, while the central links can be straight links. Likewise, the center linkages 22 have the pear-shaped links 52 at each end joined by one or more straight links. The center linkages 22 join the traction members 20 to each other around the tire. Each traction member 30 has its hooks 44 set at an angle of about 120° from each other around the circular base 32.

The assembly of the chain of this invention on a tire is carried out as follows. The wheel 14 is lifted so that the tire 10 is about 6 inches above the ground by using a dozer blade or jack and blocked up in this position. All of the traction members 20 are joined together over the tire by using the center linkages 22. In so doing, the third or unused hooks 44 of the traction members are alternated around the tire, i.e., one toward the inside and the next toward the outside of the tire.

The traction members 20 are pulled together under the tire and the last of the center linkages 22 is attached. At this point the rings appear loose but will tighten when the assembly is complete. Looseness at this point in the assembly aids the installation.

Next, starting with one end of the side chain near the bottom of the tire, the side linkages 24 are assembled around the tire by inserting a connector 30, hooking one end of a side linkage to the hook 66 and the other end to a hook 44 of each traction member. The hooks 44 used at this time are the alternate or unused hooks of each traction member. This is done on each side of the tire.

Finally, the side chains are connected to their shackles and where necessary due to tire wear or varying dimensions of tire size, the side linkages 24 are reconnected and tightened by "dropping" a link or two. In the case of a well worn tire, it may be necessary to re-space a side linkage or two about the tire with one of shorter length. In extreme cases of tire wear, it may be necessary to install bolts 50 through the offsets or hook shields 42 of the traction members to prevent the pear shaped links 52 from jumping out.

The connectors 30 make the assembly of the tire chain easy for one man and avoid the necessity of handling a heavy set of chains. The connector 30 can be used wherever quick assembly of chains of any type is required. The washers 72 provide a bearing surface between the chain link 52 in the shank 60 and the surface 64 of the base 62. Other uses for the connectors 30 will become apparent to those skilled in the art. The traction members 20 are preferably made of high strength, wear resistant pearlitic castings. The center, side and rim chains are formed of heat treated and hardened links for severe service. Likewise, the snap hooks 30 are formed of high strength, wear resistant, heat treated and hardened metal.

Referring now to FIGS. 6–9, there is shown another embodiment of a tire chain 100 wherein like parts to those used in the embodiment of FIGS. 1–5 are designated alike.

The tire chain 100 includes generally a pair of side or rim chains 28 which are held along the opposite sides of the tire 10. Mounted on the tread 13 are a series of individual traction cleat members 120. The traction cleat members 120 are mounted on the face of the tread by detachable connecting center chains or linkages 122 and side linkages 124 which are detachably connected to the side chains 22 by means of the connectors 30.

The traction cleat members 120 include a base 132 made from metal rod stock and shaped into a triangle, preferably an equilateral triangle. The ends of the rod are welded together midway between the length of one of the sides of the triangle.

As shown, the corners of the triangular base 132 are formed with a slight radius or curve. Extending between and fixed as by welding to the triangle sides at each of the corners of the base 132 is an upwardly projecting cleat plate or tooth 142. The two opposed side walls are cut away as at 142a to snugly seat against opposed sides of the rod or base 146. The cleat plates are each disposed to provide openings 143 at each corner for loosely accommodating chain links 144. To this end, the cleat plates 142 may be slightly curved as shown in FIG. 8.

The chain links 144 are preferably made from rod stock of circular cross section and are shaped into a closed loop. The loop closed link 144 is of generally pear-like contour and is disposed so that the narrow end of the opening 145 is disposed outboard of the corner openings 143.

For detachably connecting the chain links 144 and to form the center linkages are C-links 147. The C-links 147 may be made from bar stock of circular cross section and shaped into a substantially C-shape having the opposed free ends 147—147 in spaced relationship to provide a gap 148. The chain link 144 is formed with a flattened or narrowed portion 149 along one or both of the sides forming the link 144. The flattened portion 149 is of narrower width than the gap 148 so that links 144 may be passed therethrough. Thereafter the C-links 146 and the closed loop links 144 may be manipulated so that the hooked ends 151 of the C-links 146 are interlocked within the narrow end of the opening 145 of the opposing links 144. The center linkage 122 may be disassembled by reversing the above described assembly or connection. In this manner, the traction cleat members 120 are detachably connected by the center linkages 122 which lie about the tire tread 13.

In this connection, it is to be noted that the traction cleat members 120, similarly to the traction cleat members 20 of the embodiment of FIGS. 1–5, are offset or alternately staggered about the circumferences of the tread. This type of staggered arrangement results in increasing the number of traction cleat members which can be placed on the tire. Of course, it also increases the gripping power of the chains.

The side linkages 124 each include a chain length including a plurality of chain links 151 of which one link at one end is concatenated with the pear-shaped link 144. At the other end, the side linkages 124 are each detachably connected to the side chain 28 preferably by the hook connectors 30.

The hook connectors 30 are connected to the links in the side chain 28 by inserting the hook 66 in the one of the chain links in the same manner as described in connection with the embodiment of FIGS. 1–5.

The assembly of the chain on the tire is accomplished by placing the traction cleat members 120 on the face of the tire tread 13 in staggered relationship. The traction cleat members 120 each have attached thereto a pear-shaped link 144 at two of the corners of the base 132 and a side connecting linkage 124 at the remaining corner. The side linkages 124 of successive ones of the cleat members 120 are alternately draped over the opposite sides of the tire for connection with the rim chains 28. In this manner, the cleat members 120 are directly connected to only one rim chain and only indirectly to the rim chain on the other side by means of the connection with the adjacent ones of the cleat members along the opposite side of the treads.

The pear shaped links 143 extending from adjacent cleat members are connected by the C-shaped links 144 in the manner heretofore described. It is to be noted some of the central linkages 122 thus formed lie on the face of the tread 13.

Finally, the rim chains are connected at the shackles to compensate for tire wear or varying tire dimensions as described in connection with the embodiment of FIGS. 1–5.

I claim:
1. A tire chain comprising:
   (a) continuous rim chains disposable along the opposite side of tire walls,
   (b) a series of traction cleat members angularly spaced in staggered relationship to each other about the tread of the tire,
   (c) central linkage means connecting successive ones of said traction cleat members,
   (d) a pair of series of side linkages adapted to lie along opposite sides of the tire in staggered relationship,
   (e) first detachable connecting means connecting the series of side linkage along one side of the tire to alternate ones of said traction cleat members to one of the rim chains,
   (f) and second detachable connecting means connecting the series of side linkages along the opposite side of the tire to the remaining traction cleat members to the other of the rim chains.
2. The invention as defined in claim 1 wherein some of said central linkage means are arranged whereby to lie on the tread of the tire.
3. The invention as defined in claim 2 wherein said traction cleat members are staggered across the tread so that adjacent ones of the traction members span substantially the width of the tread.
4. The invention as defined in claim 1 wherein said central linkage means and said side linkage means are connected to said traction cleat members at points spaced about 120°.
5. The invention as defined in claim 1 wherein said traction cleat members comprises a base, and toothed ground gripping members projecting from said base.
6. The invention as defined in claim 5 wherein said base comprises a triangular shaped welded rod and said ground gripping members are located at the corners of said triangular base.
7. The invention as defined in claim 6 wherein said ground gripping members are cleat plates extending across the sides forming the respective corners of said triangular base and located to provide openings at said corners, and wherein said central linkage means and said side chain linkage members each include a closed loop chain link looped through said openings.
8. The invention as defined in claim 7 wherein said central linkage means comprises a substantially C-shaped link for detachably connecting said closed loop chain links.
9. The invention as defined in claim 8 wherein said closed loops are formed with a flattened portion along one side thereof, and wherein said C-link is formed with a gap having a width greater than said flattened portion but lesser than the diameter of the remainder of said closed loop chain links so that said C-link is detachably interlocked with said closed loop chain links upon alignment of said C-shaped link gap with said flattened portions and subsequent displacement over the remainder of the loop chain links.
10. The invention as defined in claim 7 wherein said side chain linkage members include a hook connector to attach said side linkage members to said rim links.
11. The invention as defined in claim 1 wherein said central linkage means, said side linkages and said traction members are individual and detachable units.
12. A tire chain in accordance with claim 1 in combination with
   (a) a hook connector rotatably attached to said side linkage members at one end to said side chains;
   (b) said hook connector member comprises a shank member with a hook at one end and a flat base at the other end;
   (c) a bearing washer retained on said shank member; and
   (d) said hook connector engages between said side chain and a link of a side linkage with the shank member extending through a link of said side chain and the hook member engages a link of said side linkage with said bearing washer between said base and the side of the link of said rim linkage.
13. A tire chain in accordance with claim 12 in which
   (a) said traction cleat members comprise a circular base member with an open center;
   (b) ground gripping members defined by a serrated circular wall extend from said base;
   (c) radially extending hook members are fixed to said base; and
   (d) said wall is inwardly offset at each of said hook members.
14. A tire chain in accordance with claim 13 in which means are provided to selectively close the opening of said hook members between said offset wall members and the ends of said hooks.
15. A tire chain traction member comprising:
   (a) a relatively flat base member having a central opening,
   (b) an upstanding wall extending from said base member provided with a serrated top edge, and
   (c) three hook members extending radially from and equally spaced circumferentially about said base member and having their openings toward said upstanding wall.
16. A tire chain traction cleat member comprising:
   (a) a base made from a rod bent into substantially triangular shape; and
   (b) a projecting cleat plate fixed to said rod adjacent each of the corners of said triangular base.
17. A tire chain traction cleat member in accordance with claim 16, in which:
   (a) said cleat plates are each fixed to said triangular base to provide an enclosed opening at each of the respective corners; and
   (b) closed loop chain links are looped through associated ones of said openings.

References Cited
UNITED STATES PATENTS

| | | | |
|---|---|---|---|
| 1,810,191 | 6/1931 | Stueckle | 152—230 |
| 2,052,893 | 9/1936 | O'Konesky | 152—228 |
| 2,706,510 | 4/1955 | Irvin | 152—228 |

JAMES B. MARBERT, Primary Examiner